United States Patent

[11] 3,532,039

| [72] | Inventor | Robert P. Rising<br>Norwalk, Connecticut |
|---|---|---|
| [21] | Appl. No. | 560,677 |
| [22] | Filed | June 27, 1966 |
| [45] | Patented | Oct. 6, 1970 |
| [73] | Assignee | The Perkin-Elmer Corporation<br>Norwalk, Connecticut<br>a corporation of New York |

[54] PANORAMIC CAMERA
5 Claims, 5 Drawing Figs.

[52] U.S. Cl. .................................................. 95/12.5, 95/15
[51] Int. Cl. .................................................. G03b 37/02
[50] Field of Search .......................................... 95/12.5, 15, 16

[56] References Cited

UNITED STATES PATENTS

| 2,487,671 | 11/1949 | Pratt | 95/15X |
| 2,863,713 | 12/1958 | Mito | 95/16 |
| 2,966,096 | 12/1960 | D'Incerti | 95/15X |
| 3,214,232 | 10/1965 | Spear | 95/16X |

Primary Examiner—John M. Horan
Attorney—Edward R. Hyde, Jr.

ABSTRACT: A panoramic camera usable in several modes in which the film is continuously moving at constant speed and the image forming optical system is continuously rotating at constant speed in synchronization with the film but in a direction of rotation opposite to the direction of movement of the film. Image motion errors caused when the camera is mounted in a moving vehicle and scanning in a fore-to-aft mode are corrected by modulating the speed of the film along one portion of its path of travel.

Patented Oct. 6, 1970

INVENTOR.
Robert P. Rising
BY
Irving M. Kriegsman
ATTORNEY.

INVENTOR.
Robert P. Rising
BY
Irving M. Kriegsman
ATTORNEY.

PANORAMIC CAMERA

The present invention relates to photography and more particularly to a continuous film feed camera of the panoramic type adapted to be mounted in an aircraft or space vehicle for taking wide scan angle photographs.

As understood in the photographic art, a panoramic camera is one in which the optical axis sweeps or scans the view to be photographed. This is distinguished from motion picture cameras wherein the optical axis is fixed at the entrance to a camera and the image motion at the film may be achieved by a rotating prism disposed in the optical path between a fixed lens and the film.

In some panoramic cameras the film is moved intermittently while in some of the more recent panoramic cameras the film is moved continuously.

A good example of a continuous film feed panoramic camera especially adapted for scanning in a transverse mode (i.e., at right angles to the direction of movement of the vehicle on which it is mounted) may be found in U.S. Pat. No. 3,234,685.

Recently, the need has arisen for a continuous film feed panoramic camera that is adapted for scanning in the fore-to-aft and forward-oblique modes in addition to the transverse mode. Hitherto, a continuous photographic record in the fore-to-aft mode (i.e., along the path of the aircraft in which the camera is mounted) has been obtained by using a plurality of strip cameras. However, these cameras provide only one photographic record of any ground object per flight. In addition, the object viewed appears at an angle dictated by the camera's placement within the aircraft. Where redundant views of specific events are anticipated to occur at known fore and aft angles relative to the aircraft, framing type "strike" cameras set to the angles of interest have been employed.

Panoramic cameras adapted for scanning in a transverse mode are not particularly suited for scanning in other modes. This is mainly due to the fact that inherent in the performance of a panoramic camera is the effect of relative motion between the airborne scanning camera and the ground target. This effect is an image motion component which varies with the scan angle. The value of this motion is dependent on the object distance and also on the vector direction of the object motion relative to the instantaneous line of sight. The magnitude of the varying image motion component is great enough to effect resolution and therefore must be compensated for or corrected as much as possible. In the continuous film feed panoramic camera disclosed in U.S. Pat. No. 3,234,865 image motion compensation (IMC) in the transverse mode is achieved by oscillating transversly a lens positioned optically between a rotating prism and a reflecting mirror. However, no provision is made for IMC in the fore-to-aft mode.

Other considerations that are important in panoramic cameras are the optical arrangements for scanning the field and the angle of scan that can be obtained. In one scanning arrangement that is conventionally used, the scanning element is a rotating prism. However, by its construction any imperfections in the prism can degrade the resolution and by its geometry will only provide for a maximum scan angle of 180°. In addition, in continuous film-feed panoramic cameras it is highly desirable to have a 100 percent duty cycle in order to avoid waste of film.

Accordingly, it is an object of this invention to provide a new and improved continuous film-feed panoramic camera.

It is another object of this invention to provide a new and improved panoramic camera adapted for scanning in the fore-to-aft and forward-oblique modes as well as the transverse mode.

It is still another object of this invention to provide for a new and improved panoramic camera that compensates for image motion when used in the fore-to-aft mode.

It is yet still another object of this invention to provide for a continuous film-feed panoramic camera that is corrected for image motion in the fore-to-aft and transverse modes.

It is another object of this invention to provide for a new and improved continuously rotating optical system for use in a panoramic camera.

It is still another object of this invention to provide for a new and improved continuous film-feed panoramic camera having a 100 percent duty cycle.

It is yet still another object of this invention to provide for a new and improved panoramic camera that will correct for distortional curvature of the horizon when used in the forward-oblique mode.

It is another object of this invention to provide for a new and improved panoramic camera having a continuously moving constant speed film transport system and a uniform constantly rotating optical system.

The above and other objects are achieved by means of a new and novel continuous film-feed panoramic camera constructed in accordance with this invention. One feature of the invention involves a new optical system which is continuously rotating in the direction of scan and which includes a pair of diagonally folded mirrors positioned on either side of a lens. The system rotates about the optical axis of the lens. Another feature of the invention involves an arrangement for modulating the speed of a small section of the film while the other portions of the film transport system remain at constant speed. This modulation, which is harmonic, serves to compensate for image motion when used in a fore-to-aft scanning mode. Image motion compensation in the transverse mode is achieved by a sinusoidal displacement of one of the above mentioned mirrors. Elimination of distortion curvature of the horizon when used in the forward-oblique mode is accomplished by varying the angular position of one of the above mentioned mirrors. By means of the novel optical arrangement, in cooperation with a new and novel film transport system, it is possible to achieve scan angles as high as 270°, and higher if so desired. Another feature of the invention involves the above-mentioned novel film transport system in which the film, as it is passing through the focal area for exposure, is supported on the rims of two wheels or discs and is moving in a direction opposite to that of the rotating optical system. Another feature of the invention involves the use of pulleys and belts in place of conventional gears.

A more complete appreciation of the invention as well as other objects and many attendant advantages thereof will become apparent as the same becomes better understood through reference to the following detailed description taken in connection with the accompanying drawings in which like reference numerals designate like parts throughout the figures thereof and wherein.

Figure 1:
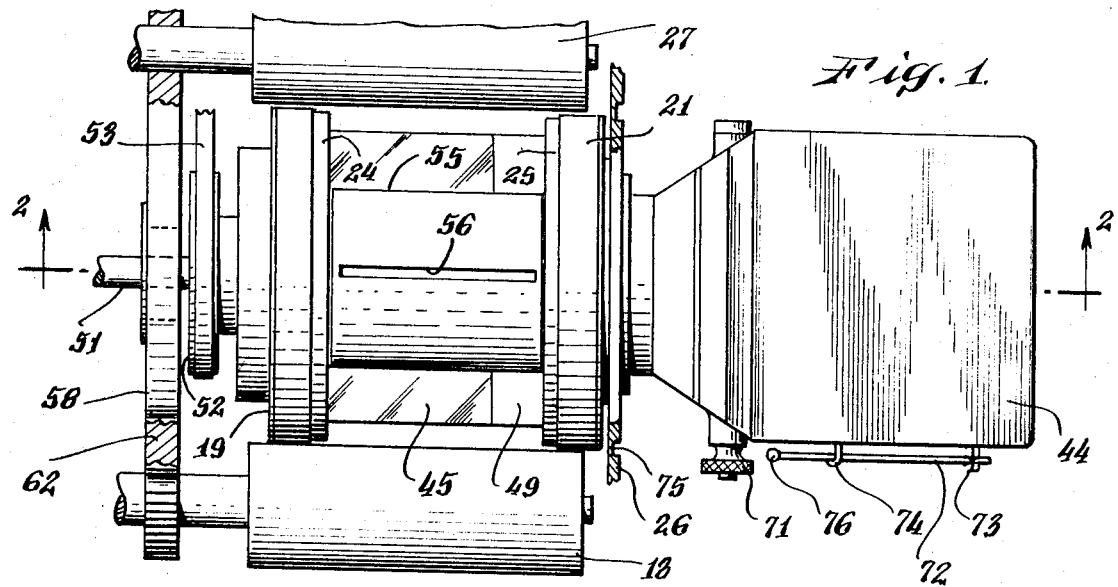
FIG. 1 is a plan view of a portion of the camera with the film removed.
Figure 2:
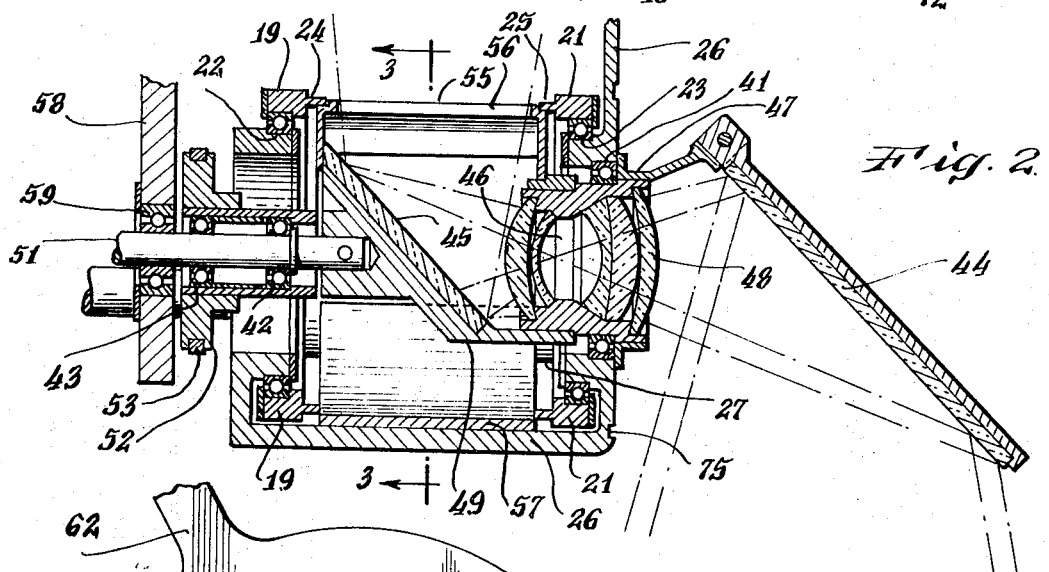
FIG. 2 is a section view taken along line 2–2 of FIG. 1.

Referring now to the drawings, a film strip 10 is fed from a supply spool 11 and received by a takeup spool 12.

From the supply spool 11 the film passes around a brake control roller or wheel 13 which is mounted on one end of a brake control arm 14. The brake control arm 14 is pivotally mounted to a spindle 15 on the supply spool 11 and attached at said same other end to a constant tension spring 16. By means of this arrangement the supply spool 11 is kept at a uniform speed.

From the brake control roller 13, the film passes through a film metering control system 17 which monitors the speed of the film and indicates the footage. Insofar as the film metering control system 17 does not form part of the invention, it has been shown herein in block diagram form.

From the film metering control system 17 the film then passes under a first IMC roller 18, whose function and utility will be described below, and then up and over a pair of wheels 19 and 21. Wheels 19 and 21 which are mounted on bearings 22 and 23 are spaced apart a suitable distance (depending on the width of the film) so as to provide the sole support for the film 10 as it is passing over for exposure. The wheels also serve to form a concave cylindrically shaped image receiving surface. Accordingly, the wheels 19 and 21 may be provided with flanged portions 24 and 25 for supporting and guiding the film. The bearings 22 and 23 are supported by the camera housing 26. As the film 10 is passing over the two wheels 19 and 21 for exposure, the emulsion side of the film 10 which is the image receiving surface is facing inward. The film surface is thus accurately positioned, being sufficiently rigid because of the curvature provided and because of its inherent resistance to stretching.

The film 10 then passes under a second IMC roller 27 and around a film speed control capstan 28.

The film speed control capstan 28 is preferably powered by a servo control system (not shown) which will give the proper speed in accordance with the height and speed of the aircraft on which the camera is mounted.

From the speed control capstan 28 the film 10 then passes through a film metering control system 29, a clutch control roller 30 which is connected to a pivotally mounted arm 31 and finally to the takeup spool 12.

A rotating optical system supported by bearings 41, 42 and 43 is mounted on the camera housing 26. The optical system is substantially tubular or cylindrical in shape and is mounted for rotation about its longitudinal axis.

The optical assembly includes a pair of diagonally folded mirrors 44 and 45. Positioned between the mirrors 44 and 45 and connected thereto is a lens assembly 46. The lens assembly includes a lens assembly mount 47 and a five element biotar lens 48. The mirrors 44 and 45 are positioned along the optical axis of the lens 48 and lie in parallel planes at an angle of approximately 45° to said optical axis. The lens assembly 46 and mirrors 44 and 45 are mounted on a supporting frame 49 which is rigidly secured to a shaft 51. Shaft 51 is connected to the capstan 28 by means of a suitable pulley and belt arrangement 52, 53 and 54. As the optical system rotates about its longitudinal axis the terrain is scanned by mirror 44 and reflected into lens 48. The image projected by lens 48 is reflected by mirror 45 and swept across the film 10. The optical path distance from the lens 48 to the film 10 is equal to the focal length of the lens. It should be noted that, because of the diagonally folded mirror arrangement, even though the lens 48 is rotating about its own optical axis the assembly is effectively sweeping along a plane transverse to said optical axis.

The wheels 21 and 22 and the lens 48 are sized such that the focal length of the lens 48 is longer than the radius of the wheels 21 and 22 which form the focal plane cylinder. Accordingly, the image drifts in retrograde fashion during scan. Thus, as can be seen in the drawings, the direction of the film movement is in opposition to the scan of the optical system.

A supporting frame 55 having a slit 56 is rigidly secured to and forms part of the rotating optical system.

Figure 3:
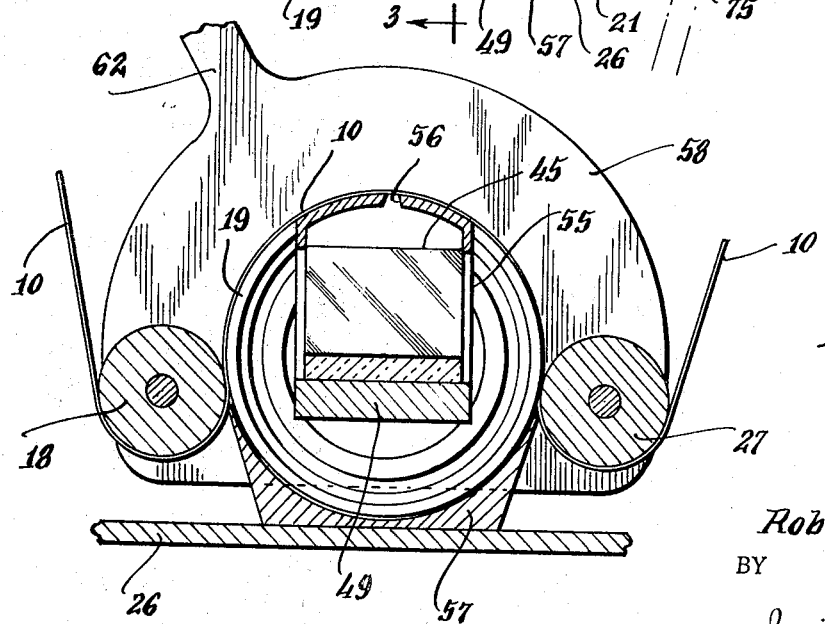
FIG. 3 is a section view taken along line 3–3 of FIG. 2.

A capping shutter 57 for making the camera light tight is fixedly mounted onto the camera housing 26 and is sized in accordance with the desired angle of scan. As can be seen in FIG. 3, the capping shutter subtends an angle of approximately 170° which results in a scan angle of approximately 190°.

Figure 4:
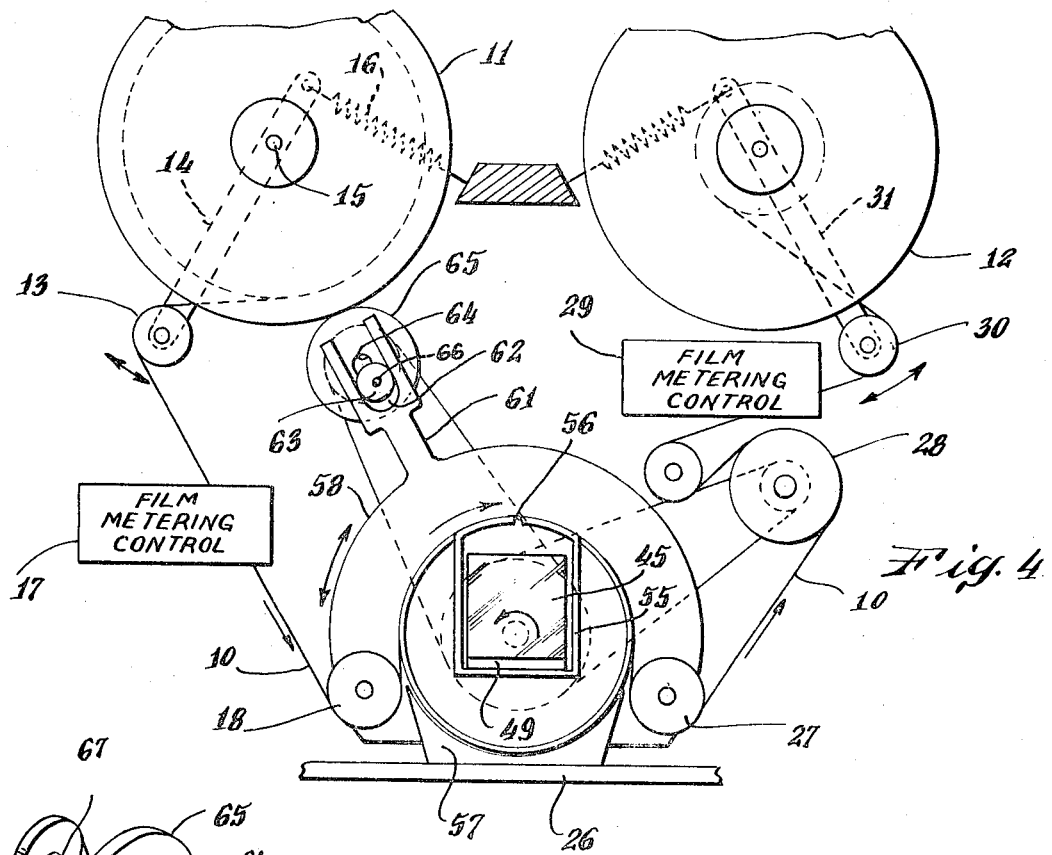
FIG. 4 is a simplified diagrammatic view of the optical and film transport systems.
Figure 5:
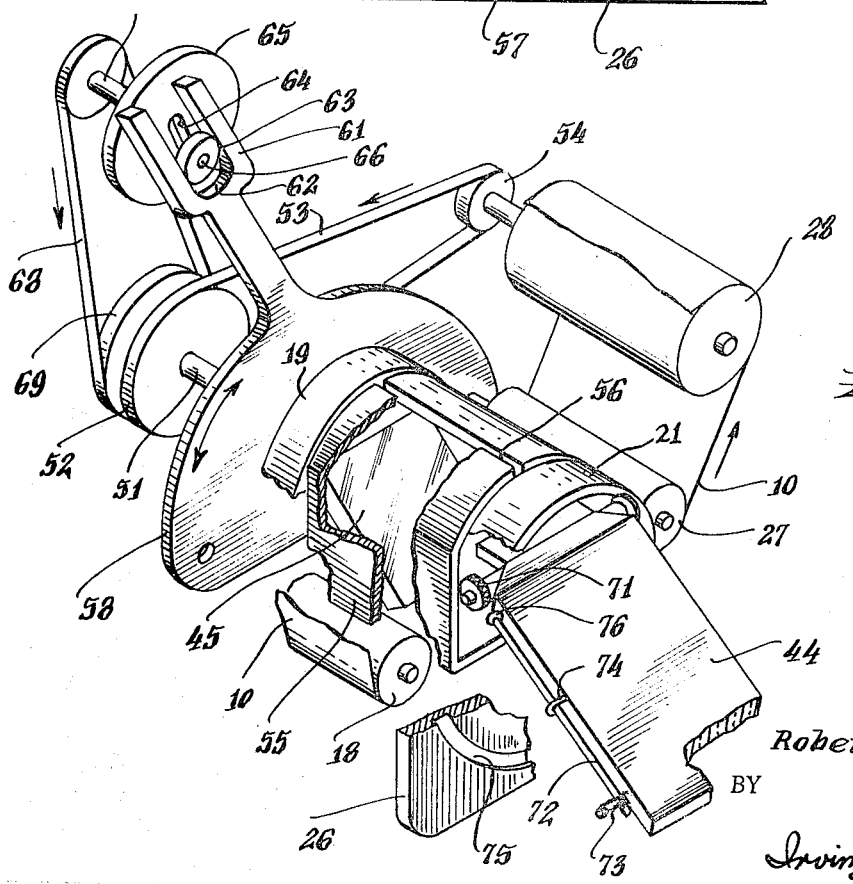
FIG. 5 is a perspective view illustrating certain mechanical features of the camera.

The camera is further provided with an image motion compensating means for use when scanning in the fore-to-aft mode. It has been found that image motion compensation (IMC) can be achieved in the fore-to-aft mode by modulating harmonically the speed of the film as it passes over the focal plane forming cylinder for exposure. In the embodiment shown, harmonic modulation of the film speed is obtained by means of the two IMC rollers 18 and 27 which rotate in an oscillatory motion about the optical axis of the lens. The two IMC rollers 18 and 27 are pivotally connected to a supporting frame or plate 58 which is mounted by means of bearings 59 onto shaft 51. Thus, plate 58 is pivotally movable relative to shaft 51. Extending radially outward from the plate member 58, which may be semicircular in shape, is a bifurcated arm or yoke 61. The yoke 61 is arranged to receive in the "slotted" area 62, a disc 63. Disc 63 is mounted in a radially extending slot 64 in a somewhat larger disc 65. Disc 63 is further provided with locking screw means 66 for securing the disc 63 in a desired position in the slot 64. When scanning in the fore-to-aft mode the disc 63 is positioned off center as shown in FIG. 4. When operating in some of the other modes, the disc is positioned at the center of wheel 65 which has the effect of eliminating the rocking movement of yoke 62. Disc 65 is in turn connected to a shaft 67 which is connected by a suitable belt 68 and pulley 69 arrangement to the shaft 51. The diameter of wheel 65 is one half that of wheel 52. Thus, wheel 65 rotates at twice the speed of wheel 52. Accordingly, as wheel 65 turns, the IMC rollers 18 and 27 oscillate harmonically about the optical axis of the lens assembly. This harmonic oscillation modulates in a sinusoidal fashion the speed of the portion of the film that passes over the wheels 19 and 21.

Mirror 44 is pivotally connected to the lens assembly mount 47. Suitable locking means such as for example screw 71 are also provided. When the locking means are in engagement, the angular position of the mirror 44 is fixed relative to the mount 47 and will not rotate. However, when the screw 71 is loosened the mirror 44 will pivot about the longitudinal axis of the screw means 71.

Located on one side of the mirror 44 is an arm 72. This arm 72 is pivotally mounted on a pin 73 which is secured to one edge of the mirror 44. Clamping means 74 are also mounted on the mirror 44 for holding the arm 72 when pivotal movement is not desired. Frame 26 is provided with a circular groove 75 of varying depth which is sized to snugly receive end 76 of arm 72. The depth of groove varies sinusoidally. Thus as can be seen from the drawings, the groove 75 is relatively shallow in FIG. 1 and relatively deep in FIG. 3.

When scanning in the fore-to-aft mode, disc 63 is positioned off center relative to wheel 65, screw 71 is locked to prevent pivotal movement of mirror 44, and arm 72 is secured by means of clamp 74.

When scanning in a transverse mode, disc 63 is centered relative to wheel 65, screw 71 is loosened, clamping means 74 is loosened and end 76 of arm 72 positioned within the groove 75.

When scanning in a forward-oblique mode, disc 63 is centered relative to wheel 65, front mirror 44 is readjusted to form an angle of approximately 48° to 50° with the optical axis, and arm 72 secured by means of clamp 74 to mirror 44.

It should be understood, of course, that the foregoing disclosure relates to only preferred embodiments of the invention and that numerous alterations and modifications may be made therein without departing from the spirit and scope of the invention as set forth in the appended claims.

I claim:

1. In a panoramic camera adapted to be mounted in an aerospace vehicle and used in at least a fore-to-aft mode, an optical system continuously rotating about an axis at constant speed and adapted to scan a strip of terrain and project an image of said scanned strip over a concave cylindrically shaped area defined by said axis of rotation, means for continuously directing a strip of film at constant speed along a predetermined path to receive the projected image, said path including an arcuate portion coextensive with the concave cylindrically shaped area of the projected image, and means for modulating the speed of the film as it passes through said arcuate portion to compensate for image motion when scanning in the fore-to-aft mode.

2. A continuous film-feed panoramic camera adapted to be mounted in a moving vehicle and usable in at least a fore-to-aft scanning mode comprising: a housing, a continuously rotating constant speed optical system adapted to scan a strip of terrain and project an image of the strip of terrain over a concave cylindrically shaped area defined by its axis of rotation, the projected image drifting in retrograde fashion relative to the direction of rotation of the optical system, a constant speed continuous film-feed transport system for moving a strip of film in synchronization with the image, said film-feed transport system including means for directing said film along the concave cylindrically shaped area of the projected image in a direction opposite to the direction of rotation of the optical system and selectively engageable means for modulating harmonically the speed of the film passing along the concave cylindrically shaped area defined by the projected image, correcting thereby image motion when the camera is mounted in a moving vehicle and scanning in a fore-to-aft mode.

3. The invention according to claim 2 and wherein said means for modulating the speed of the film includes a pair of idler rollers disposed along the film path at the concave cylindrically shaped area formed by the projected image and mounted for harmonic oscillation about said concave cylindrically shaped area.

4. An improved film transport system for use in a panoramic camera comprising: means for directing a strip of film along a predetermined path at uniform speed, means for curving said film about an arc longitudinal to the direction of travel along a portion of said predetermined path to form thereby a concave image receiving surface, and means for modulating harmonically the speed of the film as it passes over said curved portion to compensate for image motion when the panoramic camera is mounted in a moving vehicle and scanning in a fore-to-aft mode.

5. A continuous-feed panoramic camera adapted for scanning in a plurality of modes comprising means for directing a strip of film at constant speed along a predetermined path, means for curving said film along a portion of said predetermined path about an arc longitudinal to the direction of travel of the film, selectively engageable means for modulating harmonically the speed of the film as it passes over said arcuate portion, and a continuously rotating optical system in synchronization with said film directing means located within said arcuate portion of the film path for scanning an area and sweeping an image of said area onto the film as it passes over said arcuate portion, the axis of rotation of the optical system being transverse to the direction of travel of the film, said continuously rotating optical system including a pair of diagonally folded mirrors positioned on the axis of rotation and a lens located between said diagonally folded mirrors in alignment therewith and having its optical axis on said axis of rotation.